United States Patent
Li

(10) Patent No.: US 10,606,997 B2
(45) Date of Patent: Mar. 31, 2020

(54) REMOTE IDENTITY AUTHENTICATION METHOD AND SYSTEM AND REMOTE ACCOUNT OPENING METHOD AND SYSTEM

(71) Applicant: TENDYRON CORPORATION, Beijing OT (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 170 days.

(21) Appl. No.: 15/909,017

(22) Filed: Mar. 1, 2018

(65) Prior Publication Data
US 2018/0189476 A1    Jul. 5, 2018

Related U.S. Application Data
(63) Continuation of application No. PCT/CN2016/098330, filed on Sep. 7, 2016.

(30) Foreign Application Priority Data
Sep. 7, 2015    (CN) .......................... 2015 1 0564864

(51) Int. Cl.
*H04L 29/06* (2006.01)
*G06F 21/36* (2013.01)
(Continued)

(52) U.S. Cl.
CPC .............. *G06F 21/36* (2013.01); *G06F 21/32* (2013.01); *G09C 5/00* (2013.01); *H04L 9/3226* (2013.01); *H04L 9/3228* (2013.01); *H04L 9/3231* (2013.01)

(58) Field of Classification Search
CPC ..... H04L 63/08; H04L 9/3226; H04L 9/3231; G06F 21/31; G06F 21/32; G06F 21/36
See application file for complete search history.

(56) References Cited

U.S. PATENT DOCUMENTS 8,688,579 B1 *  4/2014  Ethington .......... G06Q 20/0425
                                                705/42
8,689,287 B2 *  4/2014  Bohmer .............. H04L 63/0853
                                                709/225
(Continued)

FOREIGN PATENT DOCUMENTS

CN    104200580    12/2014
CN    104361274  *  2/2015
(Continued)

OTHER PUBLICATIONS

WIPO, English translation of the ISR/WO for PCT/CN2016/098330, dated Nov. 9, 2016.

*Primary Examiner* — Hosuk Song
(74) *Attorney, Agent, or Firm* — Hodgson Russ LLP

(57) ABSTRACT

Provided in the present application are a remote authentication method and system and a remote account opening method and system. The remote authentication method includes: by an electronic cipher device, acquiring information to be validated, generating and displaying a graphic identification code on the basis of the information to be validated; by a terminal, acquiring a picture including a facial image of a user and the graphic identification code displayed on the electronic cipher device and transmitting the picture to a background server; and by the background server, receiving the picture and validating the graphic identification code and the facial image of the user provided on the picture.

18 Claims, 2 Drawing Sheets

(51) Int. Cl.
*H04L 9/32* (2006.01)
*G09C 5/00* (2006.01)
*G06F 21/32* (2013.01)

(56) References Cited

U.S. PATENT DOCUMENTS

| | | | | |
|---|---|---|---|---|
| 8,819,445 B2* | 8/2014 | Schrecker | ............... | G06F 21/31 713/185 |
| 9,129,340 B1* | 9/2015 | Medina, III | ....... | G06Q 20/0425 |
| 9,491,160 B2* | 11/2016 | Livesay | ............. | G06K 9/00288 |
| 10,262,191 B2* | 4/2019 | Jones | ................. | G06K 9/00288 |

FOREIGN PATENT DOCUMENTS

| | | |
|---|---|---|
| CN | 104767616 | 7/2015 |
| CN | 105141615 | 12/2015 |
| CN | 105245340 | 1/2016 |
| CN | 105245341 | 1/2016 |

* cited by examiner

REMOTE IDENTITY AUTHENTICATION METHOD AND SYSTEM AND REMOTE ACCOUNT OPENING METHOD AND SYSTEM

CROSS REFERENCE TO RELATED APPLICATION

This application is a continuation of International Application PCT/CN2016/098330, filed Sep. 7, 2016, which is based upon and claims priority to Chinese Patent Application Serial No. 201510564864.0, filed with the State Intellectual Property Office of P. R. China on Sep. 7, 2015, the entire contents of which are incorporated herein by reference.

FIELD

The present disclosure relates to an electronic technology field, and more particularly to a remote authentication method and a remote authentication system, a remote account opening method and a remote account opening system.

BACKGROUND

Currently, it needs generally users to go to physical counters to open bank accounts, stock accounts or the like. However, during account opening service hours of banks or securities companies, the users are generally at work and it is hard for them to have time to go to the physical counters. In order to facilitate the users to open accounts, a remote account opening method is put on the agenda. Presently, there is a remote account opening method based on VTM (Video Teller Machine or Virtual Teller Machine). The mechanism of the remote method based on the VTM is to allow the users to communicate with bank staff members face-to-face at night through a remote VTM placed in the banks. The users may realize independently counter businesses such as opening bank accounts, opening online bank and investment and financial management under guidance of the bank staff members through performing a video with the bank staff members. However, the VTM is placed in the bank, which is inconvenient for some users. At present, the remote account opening method enables the users to open accounts anytime and anywhere. In order to ensure authenticity of the accounts opened remotely, it is necessary to realize "consistence of user and resident identity card of the user". That is, realizing remote authentication of the users is a technical problem to be solved in the process of opening accounts.

SUMMARY

A remote authentication method includes: during a process of opening an account remotely, obtaining, by an electronic cipher device, information to be validated, in which the information to be validated includes one-time authentication information; generating and displaying, by the electronic cipher device, a graphic identification code based on the information to be validated; obtaining, by a terminal, a picture including a facial image of a user and the graphic identification code displayed on the electronic cipher device, and transmitting, by the terminal, the picture to a background server; receiving, by the background server, the picture, and validating, by the background server, the graphic identification code and the facial image of the user recorded in the picture.

A remote authentication system includes an electronic cipher device, a terminal and a background server. The electronic cipher device is configured to obtain information to be validated and to generate and display a graphic identification code based on the information to be validated, in which the information to be validated includes one-time authentication information. The terminal is configured to obtain a picture including a facial image of a user and the graphic identification code displayed on the electronic cipher device and to transmit the picture to the background server. The background server is configured to receive the picture and to validate the graphic identification code and the facial image of the user recorded in the picture.

BRIEF DESCRIPTION OF THE DRAWINGS

In order to more clearly illustrate the technical solutions in the embodiments of the present disclosure, brief description is introduced to the accompanying drawings required for describing the embodiments. Apparently, the accompanying drawings in the following description are only some embodiments of the present disclosure. Other accompanying drawings may be obtained by those skilled in the art based on these accompanying drawings without creative efforts.

DETAILED DESCRIPTION

Figure 1:
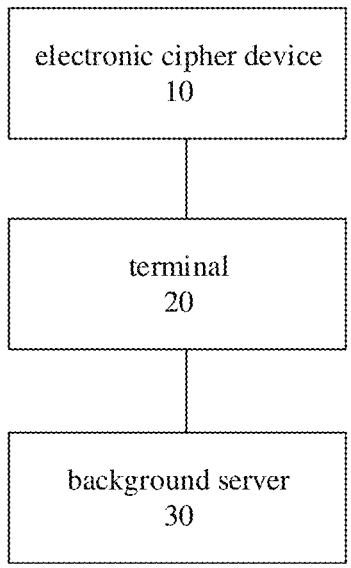
FIG. 1 is a schematic diagram of a remote authentication system provided by Embodiment One and Embodiment Two of the present disclosure.

The technical solutions in the embodiments of the present disclosure will be clearly and completely described below in combination with the accompanying drawings in the embodiments of the present disclosure. Apparently, the described embodiments are merely a part but not all of the embodiments of the present disclosure. All other embodiments obtained by those skilled in the art based on the embodiments of the present disclosure without creative efforts shall fall in the protection scope of the present disclosure.

In the description of the present disclosure, it should be understood that orientations indicated by terms "center," "longitudinal," "lateral," "upper," "lower," "front," "rear," "left," "right," "vertical," "horizontal," "top," "bottom," "inner," "outer" and the like are those based on the drawings, merely for the convenience of describing the present disclosure and simplifying the description, rather than indicating or implying that the device or element is intended to have a particular orientation, is constructed and operated in a particular orientation and therefore should not interpreted as a limitation of the application. In addition, terms such as "first" and "second" are used herein for purposes of description and are not intended to indicate or imply relative importance, amount or position.

In the description of the present disclosure, it should be understood that, unless specified or limited otherwise, the terms "mounted," "connected," and "coupled" should be understood broadly, such as which can be fixed, detached or integrated mountings, connections and couplings; can be mechanical or electrical mountings, connections and couplings; can be direct mountings, connections, and couplings and indirect mountings, connections, and couplings via an intermediate medium; also can be inner mountings, connections and couplings of two components, which can be understood by those skilled in the art based on the detail embodiment of the present disclosure. The present disclosure will be described in the following with reference to the accompanying drawings and the embodiments.

In the embodiments of the present disclosure, the user may obtain information to be validated through an electronic cipher device, and a graphic identification code may be generated and displayed through the electronic cipher device based on the information to be validated, and then a face of the user and the graphic identification code displayed on the electronic cipher device are captured through a capturing device (which may be provided on the terminal or outside the terminal). The terminal may obtain a picture including a facial image of the user and the graphic identification code displayed on the electronic cipher device and may transmit the picture to a background server. The background server may validate the graphic identification code and the facial image of the user in the picture.

In the embodiments of the present disclosure, the information to be validated may be obtained by performing a calculation via the electronic cipher device and the background server according to the same algorithm. For example, a dynamic password may be generated by the electronic cipher device and the background server in an OTP (One-time Password)-like manner. Or, the information to be validated may be one-time authentication data (for example, a random number or the like) transmitted by the background server to the electronic cipher device. Or, the information to be validated may be one-time authentication data (for example, a random number or the like) transmitted by the background server to another terminal (for example, the user's phone) of an owner of the electronic cipher device, and the owner of the electronic cipher device may input the one-time authentication data into the electronic cipher device.

The graphic identification code may be generated directly based on the information to be validated, or may be generated after the information to be validated is calculated (for example, massage authentication code (MAC) calculation or signature, etc.). For example, the graphic identification code is generated based on a calculation result. The specific examples of generating the graphic identification code are not limited in the embodiments of the present disclosure.

The graphical identification code may be a quick response code or a barcode, as long as the graphical identification code may carry information related to the information to be validated. The specific form of the graphical identification code is not limited in the embodiments of the present disclosure.

In addition, in the embodiments, the electronic cipher device may be a dynamic password token, an electronic signature token, an electronic signature token having functions of a dynamic password token, or other device, as long as the device may realize functions of the electronic cipher device of the embodiments of the present disclosure.

In addition, in the embodiments of the present disclosure, the electronic cipher device may obtain and display the graphic identification code before the terminal transmits an authentication request to the background server. The terminal may transmit the above picture to the background server when transmitting the authentication request to the background server. Or, the terminal may transmit the authentication request to the background server firstly, and then may instruct the electronic cipher device to generate and display the graphic identification code, and then may transmit the above picture to the background server. The following embodiments describe the two cases.

Embodiment One

FIG. 1 is a schematic diagram of a remote authentication system provided by the embodiment. As illustrated in FIG. 1, the system may mainly include an electronic cipher device 10, a terminal 20 and a background server 30.

In this embodiment, the terminal 20 firstly transmits an authentication request to the background server 30. Then the electronic cipher device 10 obtains information to be validated, and generates and displays a graphic identification code based on the information to be validated. The user holds the electronic cipher device 10 to be captured by the terminal 20, and the terminal 20 may obtain a picture including the facial image of the user and the graphic identification code displayed on the electronic cipher device 10 and may transmit the picture to the background server 30 for validating.

Therefore, in this embodiment, the terminal 20 is configured to transmit the authentication request to the background server 30. The authentication request carries user information therein. The user information may be resident identity card information of the user, for example, a resident identity card number of the user and the like. The electronic cipher device 10 is configured to obtain information to be validated and to generate and display the graphic identification code based on the information to be validated. The electronic cipher device 10 may obtain the information to be validated under a trigger by the terminal 20. For example, after transmitting the authentication request to the background server 30, the terminal 20 may transmit an instruction to the electronic cipher device 10 to trigger the electronic cipher device 10 to obtain the information to be validated. Or the terminal 20 may transmit an instruction to the electronic cipher device 10 after receiving an authentication request response from the background server 30 to trigger the electronic cipher device 10 to obtain the information to be validated. In addition, the electronic cipher device 10 may also obtain the information to be validated when triggered by an instruction input by the user. For example, the user presses a specific function key of the electronic cipher device 10. The terminal 20 is further configured to obtain the picture including the facial image of the user and the graphic identification code displayed on the electronic cipher device 10 and to transmit the picture to the background server 30. The background server 30 is configured to receive the picture transmitted by the terminal 20, and to validate the graphic identification code and the facial image of the user recorded in the picture.

With the above authentication system provided by the embodiment, the user may transmit the authentication request to the background server 30 through the terminal 20, and the graphic identification code may be generated through the electronic cipher device 10, and the picture including the graphic identification code and the facial image of the user may be transmitted to the background server 30 through the terminal 20. The background server 30 may validate the graphic identification code and the facial image of the user recorded in the picture, thereby realizing the remote authentication of the user.

In an alternative embodiment, the user information carried in the authentication request that is transmitted to the background server 30 by the terminal 20 may be the resident identity card information of the user, for example, a resident identity card number of the user. Or, the user information may be a ciphertext of the resident identity card information of the user. The terminal 20 obtains the ciphertext of the resident identity card information of the user and carries the ciphertext of the resident identity card information of the user as the user information in the authentication request and transmits the authentication request to the background server 30. The background server 30 is further configured to receive the authentication request and to validate the identity of the user based on the ciphertext of the resident identity card information carried in the authentication request.

In specific applications, the ciphertext of the resident identity card information of the user may be read by a resident identity card reading module (which may be provided in the terminal 20, or provided in the electronic cipher device 10, or a separated resident identity card reader) from a resident identity card of the user, and then encrypted by the electronic cipher device 10.

The resident identity card reading module may be a resident identity card reader having a security control module applied to validate resident identity cards. The resident identity card reader transmits the read resident identity card information to the electronic cipher device 10 for encryption, and the encrypted resident identity card information is transmitted to the terminal 20 by the electronic cipher device 10. Or, the resident identity card reading module may be a resident identity card reading device that does not have the security control module applied to validate the resident identity cards but only has a card reading module. In this case, the security control module applied to validate resident identity cards is set at a remote side and the resident identity card reading device communicates with the security control module applied to validate resident identity cards via network, and forwards interaction information between the security control module applied to validate resident identity cards and the resident identity card. Finally the security control module applied to validate resident identity cards may transmit the read resident identity card information to the terminal 20. The terminal 20 may transmit the resident identity card information to the electronic cipher device 10. The electronic cipher device 10 may encrypt the resident identity card information, and return the ciphertext of the resident identity card information back to the terminal 20.

In the above embodiments, the resident identity card information is read by the resident identity card reading module from the resident identity card. Since the resident identity card reading module only can read a legal resident identity card, with the above embodiments, it may guarantee legality of the resident identity card used in the user's identity authentication process. After receiving the authentication request transmitted by the terminal 20, the background server 30 may validate the identity of the user based on the ciphertext of the resident identity card information carried in the authentication request. In an alternative implementation of the embodiment of the present disclosure, the background server 30 may store a correspondence between electronic cipher devices 10 and resident identity card information of users who have obtained the electronic cipher devices 10. In the alternative implementation, after receiving the authentication request, on the one hand, the background server 30 may decrypt the ciphertext of the resident identity card information carried in the authentication request by using a decryption key corresponding to an encryption key to obtain the resident identity card information; on the other hand, the background server 30 may search for the resident identity card information corresponding to the electronic cipher device 10 from the stored correspondence between the electronic cipher devices 10 and the resident identity card information. The background server 30 compares the resident identity card information obtained by searching with the resident identity card information obtained by decryption. When the resident identity card information obtained by searching matches with the resident identity card information obtained by decryption, it is confirmed that the authentication of the user who currently requests authentication succeeds. When the resident identity card information obtained by searching does not match with the resident identity card information obtained by decryption, it is confirmed that the authentication of the user currently requesting authentication fails.

In specific applications, when storing the correspondence between the electronic cipher devices and the resident identity card information, the background server 30 may store identification information of the electronic cipher device 10 in conjunction with the resident identity card information of the user using the electronic cipher device 10. The identification information may be a digital certificate used by the electronic cipher device 10. The electronic cipher device 10 may transmit the digital certificate to the terminal 20. The terminal 20 may carry the digital certificate in the authentication request and transmit the authentication request to the background server 30. The background server 30 may obtain the identification information of the electronic cipher device 10 from the digital certificate. Or, the background server 30 may transmit, through the terminal 20, an instruction to the electronic cipher device 10 for requesting obtaining the identification information after receiving the authentication request. In addition, the background server 30 may also determine the decryption key for decrypting the ciphertext of the resident identity card information based on the identification information of the electronic cipher device 10. Or the background server 30 may also negotiate transmission keys (including the encryption key and the decryption key) with the electronic cipher device 10 to establish a secure transmission channel, and then the electronic cipher device 10 may transmit the ciphertext of the resident identity card information to the background server 30 through the terminal 20.

Certainly, the identification information is not limited to the digital certificate and may also be a serial number of the electronic cipher device 10 or the like. The specific content of the identification information of the electronic cipher device 10 in this embodiment is not limited, as long as one electronic cipher device 10 can be uniquely identified based on the identification information.

In addition, in the specific applications, the encryption key and the decryption key used by the electronic cipher device 10 and the background server 30 may be asymmetric keys. For example, the encryption key may be a private key of the electronic cipher device 10, and the decryption key used by the background server 30 may be a public key of the electronic cipher device 10. Or, the encryption key and the decryption key may be symmetric keys. The embodiment is not limited thereto.

With the above embodiments, the background server 30 may compare the resident identity card information read by the resident identity card reading module with the pre-stored resident identity card information to validate the identity of the user, so as to determine whether the legal holder of the electronic cipher device 10 and the user with the current resident identity card is the same person, thereby avoiding a situation that the user's resident identity card or the user's electronic cipher device is lost and used fraudulently for authentication by other people.

In an alternative implementation of the embodiment of the present disclosure, in order to ensure that the ciphertext of the resident identity card information transmitted by the terminal 20 to the background server 30 is non-repudiated and will not be tampered with, the user information transmitted by the terminal 20 may further include signature data of the ciphertext of the resident identity card information. That is, in the alternative implementation, the electronic cipher device 10 is further configured to sign the ciphertext of the resident identity card information. That is, the electronic cipher device 10 is further configured to perform a signing and calculation on the ciphertext of the resident identity card information by using the private key stored in the electronic cipher device 10, and to transmit the signature data obtained by performing the signing and calculation the ciphertext of the resident identity card information to the terminal 20. The terminal 20 is configured to carry the ciphertext of the resident identity card information of the user and the signature data of the ciphertext of the resident identity card information as the user information in the authentication request to transmit the authentication request to the background server 30. The background server 30 is further configured to validate the signature data of the ciphertext of the resident identity card information. In specific applications, in order to save processes, the background server 30 may firstly validate the signature data of the ciphertext of the resident identity card information and then authenticate the identity of the user based on the ciphertext of the resident identity card information after the validation of the signature data passes. If the validation of the signature data fails, the identity of the user is no longer authenticated based on the ciphertext of the resident identity card information and the authentication request of the user is rejected directly.

In specific applications, in the above embodiment, during the signature calculation, the electronic cipher device 10 may calculate digest information of the ciphertext of the resident identity card information. The electronic cipher device 10 may encrypt the digest information by using the private key stored in the electronic cipher device 10 and use the digest information encrypted by the private key as the signature data of the ciphertext of the resident identity card information. The electronic cipher device 10 may transmit the ciphertext of the resident identity card information together with the signature data of the ciphertext of the resident identity card information to the terminal 20. The terminal 20 carries the ciphertext of the resident identity card information and the signature data of the ciphertext of the resident identity card information as the user information in the authentication request and transmits the authentication request to the background server 30. After receiving the authentication request, the background server 30 firstly needs to validate the signature data of the ciphertext of the resident identity card information. The validating process is as follows. The background server 30 decrypts the encrypted digest information received by using the public key of the electronic cipher device 10 to obtain the digest information of the ciphertext of the resident identity card information; then the background server 30 calculates the received digest information of the ciphertext of the resident identity card information and compares the digest information obtained by calculation with the digest information obtained by decryption. If the digest information obtained by calculation and the digest information obtained by decryption are the same, it indicates that the ciphertext of the resident identity card information has not been modified and the resident identity card information is complete.

With the above alternative implementation, it may prevent that illegal people uses the lost resident identity card and the electronic cipher device 10 of the illegal people to authorize his identity when the resident identity card is lost by the user. Moreover, the private key of the electronic cipher device 10 is used to sign the ciphertext of the resident identity card information to obtain the signature data of the ciphertext of the resident identity card information. The background server 30 validates the signature data of the ciphertext of the resident identity card information. On the one hand, it is determined that the ciphertext of the resident identity card information is transmitted by the signer based on the signature data. On the other hand, it is compared whether the digest information obtained by the background server 30 through calculating the ciphertext of the resident identity card information is consistent with the digest information obtained by decryption, thereby preventing the illegal people from modifying the resident identity card information.

In an alternative implementation of the embodiment of the present disclosure, the information to be validated is obtained by the electronic cipher device 10 through four ways without limitations.

Way One: the information to be validated is generated by the background server 30 and is transmitted to the electronic cipher device through the terminal 20.

In the implementation, the background server 30 is further configured to generate the information to be validated after receiving the authentication request transmitted by the terminal 20, and to carry the information to be validated in an authentication request response to transmit the authentication request to the terminal 20. Alternatively, the background server 30 may also encrypt the information to be validated and then transmit the encrypted information to be validated to the terminal 20 so as to ensure the transmission security. For example, the background server 30 may encrypt the information to be validated by using the private key of the background server 30, or by using the transmission key negotiated with the electronic cipher device 10.

The terminal 20 is further configured to receive the authentication request response which carries a plaintext or a ciphertext of the information to be validated from the background server 30, and to transmit the plaintext or the ciphertext of the information to be validated to the electronic cipher device 10.

Alternatively, after receiving the authentication request transmitted by the terminal 20, the background server 30 may authenticate the identity of the user based on the user information carried in the authentication request. After the authentication succeeds, the background server 30 generates the information to be validated. For example, the background server 30 may generate the information to be validated based on the user information of the user, a serial number of the electronic cipher device, the current time, or other information, or the random number randomly generated by the background server 30 may be used as the information to be validated. This embodiment does not limit the manner in which the background server 30 generates the information to be validated. To avoid the replay attack, alternatively, the information to be validated is one-time authentication data. That is, the information to be validated may be invalidated after being used once. The information to be validated may be a series of numbers, letters or symbols, or any combination of numbers, letters or symbols. This embodiment also does not limit the specific presentation form of the information to be validated. Certainly, the background server 30 may also encrypt the plaintext of the information to be validated to generate the ciphertext of the information to be validated, so as to ensure the transmission security of the information to be validated. In addition, the encryption operation may be symmetric encryption or asymmetric encryption.

The electronic cipher device 10 is further configured to receive the information to be validated transmitted by the terminal 20. The electronic cipher device 10 is further configured to decrypt the ciphertext of the information to be validated when the received information to be validated is a ciphertext.

Way Two: the information to be validated is generated by the electronic cipher device 10.

In the implementation, the electronic cipher device 10 generates the information to be validated based on parameters synchronized with the background server 10. For example, the electronic cipher device 10 generates the information to be validated according to an existing OTP manner. The parameters that are synchronized among the electronic cipher device 10 and the background server 10 may be temporal parameters, usage frequency parameters or other synchronization parameters. The information to be validated obtained by calculation through the electronic cipher device 10 using the parameters synchronized with the background server 30 does not need to be transmitted from the background server 30 to the terminal 20, so as to ensure the security of the information to be validated and prevent the information to be validated from being intercepted during the transmission.

Way Three: the information to be validated is the user information obtained by the terminal 20.

In the implementation, the electronic cipher device 10 receives the user information transmitted by the terminal 20 and uses the user information as the information to be validated. The information to be validated is the user information (for example, the user's name, the user's resident identity card number, etc.) obtained by the terminal 20. The terminal 20 transmits the user information to the electronic cipher device 10. The electronic cipher device 10 receives the user information transmitted by the terminal 20 and directly uses the user information as the information is to be validated. Using, by the electronic cipher device 10, the user information obtained by the terminal 20 as the information to be validated has the advantage of being simple and quick.

Way Four: the information to be validated is input to the electronic cipher device 10 by the user.

In the implementation, the background server 30 may generate the information to be validated based on the above Way One and transmit the information to be validated to the terminal 20 or other external devices. But the terminal 20 or other external devices does not transmit the information to be validated to the electronic cipher device 10, instead, the terminal 20 or other external devices displays the information to be validated. Then the user inputs the information to be validated through an input device (such as a keyboard) of the electronic cipher device 10. Therefore, the device for obtaining the information to be validated is separated from the electronic cipher device 10. When the electronic cipher device 10 of the user is lost, the illegal people cannot obtain the information to be validated, thereby preventing the illegal people from being authenticated by using the electronic cipher device 10 when the electronic cipher device 10 is lost. Or, the user may input the user information into the electronic cipher device 10 instead of transmitting the user information by the terminal 20, so as to prevent the hacker from remotely operating the user's terminal and modifying the user information transmitted from the terminal 20 to the electronic cipher device 10.

After obtaining the information to be validated, the electronic cipher device 10 generates and displays the graphic identification code based on the information to be validated. The background server 30 can conveniently identify the information to be validated subsequently. In an alternatively implementation of the embodiment of the present disclosure, the manner in which the electronic cipher device 10 generates the graphic identification code includes but is not limited to the following Manner One and Manner Two.

Manner One: the electronic cipher device 10 directly converts the information to be validated into the graphic identification code.

That is, after obtaining the information to be validated, the electronic cipher device 10 directly converts the information to be validated into the graphic identification code by using a graphic identification code algorithm. It should be noted that the graphic identification code algorithm is an algorithm for generating the graphic identification code from the information to be validated. For example, if the graphic identification code is a quick response code, the graphic identification code algorithm is an algorithm for generating the quick response code from the information to be validated, that is, a quick response code generating algorithm. By converting the information to be validated into the graphic identification code, the background server 30 may conveniently identify the information to be validated subsequently.

Manner Two: the electronic cipher device 10 calculates the information to be validated according to a preset algorithm and generates the graphic identification code corresponding to a calculation result.

Different from the above Manner One, after obtaining the information to be validated, the electronic cipher device 10 does not directly convert the information to be validated into the graphic identification code by using the graphic identification code algorithm, but calculates the information to be validated according to the preset algorithm and then generates the graphic identification code corresponding to the calculation result with the graphic identification code algorithm. In this way, the amount of computation for generating the graphical identification code can be reduced and the processes can be saved.

Alternatively, the electronic cipher device 10 calculating the information to be validated may include but be not limited to:

(1) The electronic cipher device 10 uses the private key stored therein to sign the information to be validated.

In detail, the electronic cipher device 10 may firstly calculate the digest information of the information to be validated and encrypt the digest information by using the private key stored therein to generate the signature data of the information to be validated. After obtaining the signature data of the information to be validated, the background server 30 validates the signature data of the information to be validated with the public key corresponding to the private key of the electronic cipher device. It can prevent the hacker from tampering with the information to be validated on the one hand, and ensure that the information to be validated is transmitted by the specific electronic cipher device 10 on the other hand.

(2) The electronic cipher device 10 performs a MAC calculation on the information to be validated.

It should be noted that, the MAC algorithm is an encryption algorithm. The electronic cipher device 10 may encrypt the information to be validated without limitations to the MAC algorithm. Any algorithm for encryption is within the protection scope of the present disclosure. The encryption algorithm that can be used in the embodiment may be as follows.

1) Symmetric encryption algorithms including DES (Data Encryption Standard), 3DES (Triple Data Encryption standard) or AES (Advanced Encryption Standard).

2) MAC algorithms, symmetric MAC algorithms including DES-CBC (Data Encryption Standard—Electronic Book Code), 3DES-CBC (Triple Data Encryption standard—Electronic Book Code), AES-CBC (Advanced Encryption Standard—Electronic Book Code); HMAC (Hash-based Message Authentication Code) algorithms including HMAC-MD5 (Hash-based Message Authentication Code—Message Digest 5) and HMAC-SHA1 (Hash-based Message Authentication Code—Secure Hash Algorithm).

By encrypting the information to be validated, it is possible to prevent the illegal people from intercepting the information to be validated and then using the intercepted information to be validated for authentication.

In addition, the terminal 20 is further configured to obtain a picture including the facial image of the user and the graphic identification code displayed on the electronic cipher device 10, and to transmit the picture to the background server 30.

In an alternative implementation of the embodiment of the present disclosure, the picture including the facial image of the user and the graphic identification code displayed on the electronic cipher device 10 may be obtained by capturing an image including the face of the user and the graphic identification code displayed on the electronic cipher device 10 through a capturing device provided on the terminal 20, or by capturing the image including the face image of the user and the graphic identification code displayed on the electronic cipher device 10 through an external capturing device and then by transmitting the image to the terminal 20. In latter case, the hardware requirement for the terminal 20 can be reduced, and it is unnecessary to provide the capturing device on the terminal 20.

After obtaining the picture including the facial image of the user and the graphic identification code displayed on the electronic cipher device 10, the terminal 20 transmits the picture to the background server 30. After receiving the picture including the facial image of the user and the graphic identification code, the background server 30 firstly identify the graphic identification code recorded in the picture to determine the identity of the user of the electronic cipher device 10. That is, the background server 30 may validate whether information carried by the graphic identification code is predetermined information. For example, if the information to be validated is generated by the background server 30 and transmitted to the electronic cipher device 10 through the terminal 20, (1) when the electronic cipher device 10 generates the graphic identification code directly from the information to be validated, the background server 30 identifies the graphic identification code and determines whether the information carried by the graphic identification code is the same as the information to be validated generated by the background server 30; (2) when the electronic cipher device 10 signs the information to be validated to generate the graphic identification code based on the signature data, the background server 30 identifies the graphic identification code, obtains the information carried by the graphic identification code, and decrypts the information by using the public key of the electronic cipher device 10. On the other hand, the background server 30 performs a Hash calculation on the information to be validated generated by the background server 30, compares the calculated result with the result of decrypting the above information to determine whether the two results are the same; (3) when the electronic cipher device 10 performs the MAC calculation on the information to be validated and generates the graphic identification code from the calculation result, the background server 30 identifies the graphic identification code, obtains the information carried by the graphic identification code. On the other hand, the background server 30 performs the MAC calculation on the information to be validated generated by the background server 30, compares the calculated result with the information carried by the graphic identification code to determine whether the two results are the same. If the information to be validated is generated by the electronic cipher device 10, the validation of the graphic identification code by the background server 30 is similar to that the information to be validated is generated by the background server 30, except that the information to be validated used for authentication is generated by background server 30 by adopting the same manner as that adopted by the electronic cipher device 10, and details are not described herein again. If the information to be validated is the user information obtained by the terminal 20, the validation of the graphic identification code by the background server 30 is similar to that the information to be validated is generated by the background server 30, except that the information to be validated used for authentication by the background server 30 is obtained by the background server 30 from the authentication request, and details are not described herein again. If the information to be validated is input to the electronic cipher device by the user, and if the information to be validated input by the user is generated by the background server 30 and transmitted to the terminal 20 or other external devices, the manner for validating the graphic identification code by the background server 30 is same as the manner that the above information to be validated is generated by the background server 30 and transmitted to the electronic cipher device 10 through the terminal 20. If the information to be validated input by the user is the user information, the manner in which the background server 30 validates the graphic identification code is the same with that the information to be validated is the user information obtained by the terminal 20, and details are not described herein again.

In addition, the background server 30 may alternatively pre-store the identity information including the facial image of the user. When authenticating the facial image of the user included in the picture, the background server 30 may compare the facial image of the user uploaded by the terminal 20 with the pre-stored facial image of the user. If the two facial images match with each other, the validation passes, and if the two facial images do not match with each other, the validation fails. In specific applications, the background server 30 may store a correspondence between the identification information of the user and the identity information of the user. The identification information of the user may be a resident identity card number, or a resident identity card number plus a user name, or a serial number of the electronic cipher device 10 used by the user, or a certificate used by the electronic cipher device 10 used by the user. In an alternative implementation of the embodiment of the present disclosure, the background server 30 may store the correspondence between the electronic cipher device 10 (which may be identifiable by the serial number of the electronic cipher device 10, the certificate used, etc.) and the identity information of the user. In detail, when the user goes to handle the electronic cipher device 10, the electronic cipher device 10 of the user and the identity information of the user may be uploaded to the background server 30 through the counter to be stored in conjunction. Or, the background server 30 may call an identity information system to display the facial image of the user based on the information of the electronic cipher device 10. After receiving the facial image of the user uploaded by the terminal 20, the background server 30 may validates the facial image of the user by the followings. The pre-stored identity information of the user corresponding to the electronic cipher device 10 is obtained. The identity information includes the facial image of the user. The facial image of the user recorded in the picture is compared with the facial image of the user included in the obtained identity information. It is determined that the validation passes if the two facial images match with each other and that the validation fails if the two facial images do not match with each other. In specific applications, the comparison method can be face recognition technology, and also can be identified by background staff. In the case of matching, the background server 30 can confirm whether or not the electronic cipher device is of the authentic person requesting the authentication.

In addition, in an alternative implementation of the embodiment of the present disclosure, the background server 30 transmits a retransmission instruction to the terminal 20 for instructing the terminal 20 to re-upload the picture until the validation passes or the validation reaches a preset number of times when the validation of the graphic identification code and the validation of the facial image of the user recorded in the picture both fail. By allowing the user to upload pictures for multiple times, it can prevent misidentification problems that occur during image recognition. Limiting the times of uploading pictures can prevent the user from unrestricted uploading pictures with the failing validation.

Embodiment Two

FIG. 1 is a schematic diagram of a remote authentication system provided by the embodiment. As illustrated in FIG. 1, the system may include an electronic cipher device 10, a terminal 20 and a background server 30.

In the embodiment, the electronic cipher device 10 obtains the information to be validated and generates and displays a graphic identification code based on the information to be validated. The user uses the electronic cipher device 10 to be captured by the terminal 20, and the terminal 20 may obtain a picture including the facial image of the user and the graphic identification code displayed on the electronic cipher device 10 and may transmit the picture to the background server 30 for validating.

Different from Embodiment One, in this embodiment, before the electronic cipher device 10 transmits the authentication request to the background server 30, the electronic cipher device 10 generates and displays the graphic identification code. The terminal 20 obtains the picture including the facial image of the user and the graphic identifier Code. The terminal 20 transmits the above picture to the background server 30 while transmitting the authentication request.

In an alternative implementation of the embodiment of the present disclosure, the information to be validated is obtained by the electronic cipher device 10 through several ways without limitations.

Way One: the information to be validated is generated by the electronic cipher device 10.

In the implementation, the electronic cipher device 10 generates the information to be validated based on parameters synchronized with the background server 10. For example, the electronic cipher device 10 generates the information to be validated according to an existing OTP manner. The parameters that are synchronized among the electronic cipher device 10 and the background server 10 may be temporal parameters, usage frequency parameters or other synchronization parameters. The information to be validated obtained by calculation through the electronic cipher device 10 using the parameters synchronized with the background server 30 t does not need to be transmitted from the background server 30 to the terminal 20, so as to ensure the security of the information to be validated and prevent the information to be validated from being intercepted during the transmission.

Way Two: the information to be validated is the user information obtained by the terminal 20.

In the implementation, the electronic cipher device 10 receives the user information transmitted by the terminal 20 and uses the user information as the information to be validated. The information to be validated is the user information (for example, the user's name, the user's resident identity card number, etc.) obtained by the terminal 20. The terminal 20 transmits the user information to the electronic cipher device 10. The electronic cipher device 10 receives the user information transmitted by the terminal 20 and directly uses the user information as the information to be validated. Using by the electronic cipher device 10, the user information obtained by the terminal 20 as the information to be validated has the advantage of being simple and quick.

Way Three: the information to be validated is input to the electronic cipher device 10 by the user.

In the implementation, the user may input the user information into the electronic cipher device 10 instead of transmitting the user information by the terminal 20, so as to prevent the hacker from remotely operating the user's terminal and modifying the user information transmitted from the terminal 20 to the electronic cipher device 10.

After obtaining the information to be validated, the electronic cipher device 10 generates and displays the graphic identification code based on the information to be validated. Therefore, the background server 30 may conveniently identify the information to be validated subsequently. In the embodiment, the manner in which the electronic cipher device 10 generates the graphic identification code based on the information to be validated is the same as that in Embodiment One of the present disclosure. That is, the electronic cipher device 10 directly converts the information to be validated into the graphic identification code or the electronic cipher device 10 calculates the information to be validated according to a preset algorithm and generates the graphic identification code corresponding to a calculation result. The specific implementation manner is the same as that in Embodiment One, and details are not described herein again. In addition, the calculation performed by the electronic cipher device 10 on the information to be validated is also the same as that in Embodiment One, and details are not described herein again.

In addition, the manner in which the terminal 20 obtains the picture including the facial image of the user and the graphic identification code displayed on the electronic cipher device 10 is the same as that in Embodiment One of the present disclosure, and details are not described herein again.

In addition, after obtaining the above picture, the terminal 20 carries the picture in the authentication request and transmits the authentication request to the background server 30. The user information carried in the authentication request is the same as that in Embodiment One of the present disclosure, which may be may be the ciphertext of the resident identity card information of the user or may be the signature data of the ciphertext of the resident identity card information, and details are not described herein again. The manner in which the resident identity card reading module reads the resident identity card information is also the same as that in Embodiment One of the present disclosure, and details are not described herein again.

In addition, after receiving the authentication request, the background server 30 validates the identity of the user based on the ciphertext of the resident identity card information in the same way as in Embodiment One of the present disclosure, and details are not described herein again.

In addition, after the background server 30 receives the picture transmitted by the terminal, the background server 30 validates the graphic identification code and the facial image of the user recorded in the picture in the same manner as in Embodiment One of the present disclosure, and details are not described herein again.

In addition, when the validation of the graphic identification code and the validation the facial image of the user through the background server 30 both fail, the background server 30 transmits a retransmission instruction to the terminal 20 for instructing the terminal to re-upload the picture, until the validation succeeds or the validation reaches a present number of times. By allowing the user to upload pictures for multiple times, it can prevent misidentification problems that occur during image recognition. Limiting the times of uploading pictures can prevent the user from unrestricted uploading pictures with the failing validation.

Embodiment Three

The embodiment provides a remote account opening system, which uses the remote authentication system provided in Embodiment One or Embodiment Two to authenticate the identity of the user. After the authentication of the identity of the user passes, the background server 30 remotely opens an account. It may realize to open accounts anytime and anywhere by the user, which is convenient for the user and may improve user's experience.

It should be noted that after the authentication passes, the background server 30 may automatically open an account remotely, or a staff may control the background server 30 to remotely open an account.

Embodiment Four

Figure 2:
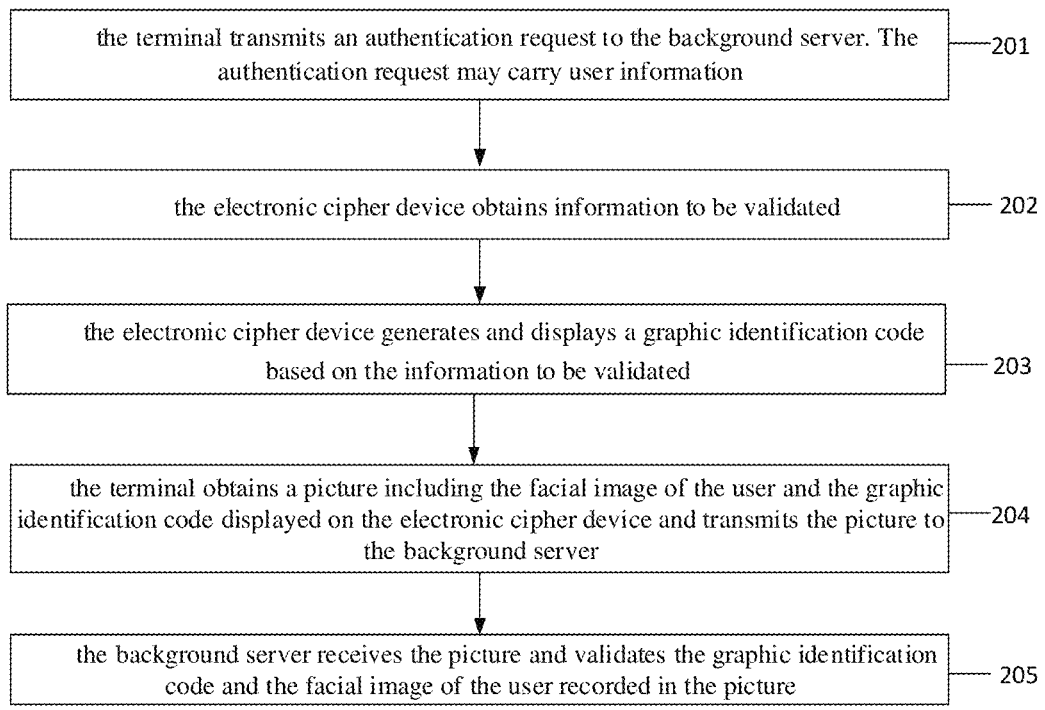
FIG. 2 is a flow chart of a remote authentication method provided by Embodiment Four of the present disclosure.

The embodiment provides a remote authentication method, which is an authentication method implemented via the system provided in Embodiment One. FIG. 2 is a flow chart of a remote authentication method provided by Embodiment Four of the present disclosure. The method embodiment illustrated as FIG. 2 includes the following steps.

At step 201, a terminal transmits an authentication request to a background server. The authentication request may carry user information therein.

At step 202, the electronic cipher device obtains information to be validated.

At step 203, the electronic cipher device generates and displays a graphic identification code based on the information to be validated.

At step 204, the terminal obtains a picture including the facial image of a user and the graphic identification code displayed on the electronic cipher device and transmits the picture to the background server.

At step 205, the background server receives the picture and validates the graphic identification code and the facial image of the user recorded in the picture.

In this embodiment, the terminal transmits the authentication request to the background server. The authentication request carries the user information therein. The user information may be resident identity card information of the user, for example, a resident identity card number of the user and the like. The electronic cipher device obtains the information to be validated and generates and displays the graphic identification code based on the information to be validated. The electronic cipher device may obtain the information to be validated under a trigger by the terminal. For example, after transmitting the authentication request to the background server, the terminal may transmit an instruction to the electronic cipher device to trigger the electronic cipher device to obtain the information to be validated. Or the terminal may transmit an instruction to the electronic cipher device after receiving an authentication request response from the background server to trigger the electronic cipher device to obtain the information to be validated. In addition, the electronic cipher device may also obtain the information to be validated when triggered by an instruction input by the user. For example, the user presses a specific function key of the electronic cipher device. The terminal obtains the picture including the facial image of the user and the graphic identification code displayed on the electronic cipher device and transmits the picture to the background server. The background server receives the picture transmitted by the terminal, and validates the graphic identification code and the facial image of the user recorded in the picture.

With the above authentication method provided by the embodiment, the user may transmit the authentication request to the background server through the terminal, and the graphic identification code may be generated through the electronic cipher device, and the picture including the graphic identification code and the facial image of the user may be transmitted to the background server through the terminal. The background server may validate the graphic identification code and the facial image recorded in the picture, thereby realizing the remote authentication of the user.

In the method:

At step 201, the terminal transmits the authentication request to the background server. The authentication request may carry the user information therein.

Before the electronic cipher device obtains the information to be validated, the terminal transmits the authentication request to the background server. The authentication request carries the user information therein.

As an alternative implementation of the embodiment of the present disclosure, the user information carried in the authentication request that is transmitted to the background server by the terminal may be the resident identity card information of the user, for example, a resident identity card number of the user. Or, the user information may be a ciphertext of the resident identity card information of the user. The terminal obtains the ciphertext of the resident identity card information of the user and carries the ciphertext of the resident identity card information of the user as the user information in the authentication request and transmits the authentication request to the background server. The background server receives the authentication request and validates the identity of the user based on the ciphertext of the resident identity card information carried in the authentication request.

In specific applications, the ciphertext of the resident identity card information of the user may be read by a resident identity card reading module (which may be provided in the terminal, or provided in the electronic cipher device, or a separated resident identity card reader) from a resident identity card of the user, and then encrypted by the electronic cipher device.

The resident identity card reading module may be a resident identity card reader that has a security control module applied to validate resident identity cards. The resident identity card reader transmits the read resident identity card information to the electronic cipher device for encryption, and the encrypted resident identity card information is transmitted to the terminal Or, the resident identity card reading module may be a resident identity card reading device that does not have the security control module applied to validate resident identity cards but only has a card reading module. In this case, the security control module applied to validate resident identity cards is set at a remote side and the resident identity card reading device communicates with the security control module applied to validate resident identity cards via network, and forwards interaction information between the security control module applied to validate resident identity cards and the resident identity card. Finally the security control module applied to validate resident identity cards transmits the read resident identity card information to the terminal. The terminal transmits the resident identity card information to the electronic cipher device. The electronic cipher device encrypts the resident identity card information, and returns the ciphertext of the resident identity card information back to the terminal.

In the above embodiments, the resident identity card information is read by the resident identity card reading module from the resident identity card. Since the resident identity card reading module only can read a legal resident identity card, with the above embodiments, it may guarantee legality of the resident identity card used in the user's identity authentication process.

After receiving the authentication request transmitted by the terminal, the background server may validate the identity of the user based on the ciphertext of the resident identity card information carried in the authentication request.

In an alternative implementation of the embodiment of the present disclosure, the background server may store a correspondence between electronic cipher devices and resident identity card information of users who have obtained the electronic cipher devices. In the alternative implementation, after receiving the authentication request, on the one hand, the background server may decrypt the ciphertext of the resident identity card information carried in the authentication request by using a decryption key corresponding to an encryption key to obtain the resident identity card information; on the other hand, the background server may search for the resident identity card information corresponding to the electronic cipher device from the stored correspondence between the electronic cipher devices and the resident identity card information. The background server compares the resident identity card information obtained by searching with the resident identity card information obtained by decryption. When the resident identity card information obtained by searching matches with the resident identity card information obtained by decryption, it is confirmed that the authentication of the user who currently requests opening an account succeeds. When the resident identity card information obtained by searching does not match with the resident identity card information obtained by decryption, it is confirmed that the authentication of the user currently requesting opening an account fails.

In specific applications, when storing the correspondence between the electronic cipher devices and the resident identity card information, the background server may store identification information of the electronic cipher device in conjunction with the resident identity card information of the user using the electronic cipher device. The identification information may be a digital certificate used by the electronic cipher device. The electronic cipher device may transmit the digital certificate to the terminal. The terminal may carry the digital certificate in the authentication request and transmit the authentication request to the background server. The background server may obtain the identification information of the electronic cipher device from the digital certificate. Or, the background server may transmit, through the terminal, an instruction to the electronic cipher device for requesting obtaining the identification information after receiving the authentication request. In addition, the background server may also determine the decryption key for decrypting the ciphertext of the resident identity card information based on the identification information of the electronic cipher device, or may also negotiate transmission keys (including the encryption key and the decryption key) with the electronic cipher device to establish a secure transmission channel, and then the electronic cipher device may transmit the ciphertext of the resident identity card information to the background server through the terminal.

Certainly, the identification information is not limited to the digital certificate and may also be a serial number of the electronic cipher device or the like. The specific content of the identification information of the electronic cipher device in this embodiment is not limited as long as one electronic cipher device can be uniquely identified based on the identification information. In addition, in the specific applications, the encryption key and the decryption key used by the electronic cipher device and the background server may be asymmetric keys. For example, the encryption key may be a private key of the electronic cipher device, and the decryption key used by the background server may be a public key of the electronic cipher device. Or, the encryption key and the decryption key may be symmetric keys. The embodiment is not limited thereto.

With the above embodiments, the background server, during an account opening process, may compare the resident identity card information read by the resident identity card reading module with the pre-stored resident identity card information to validate the identity of the user, so as to determine whether the legal holder of the electronic cipher device and the user with the current resident identity card is the same person, thereby avoiding a situation that the user's resident identity card or the user's electronic cipher device is lost and used fraudulently for authentication by other people.

In an alternative implementation of the embodiment of the present disclosure, in order to ensure that the ciphertext of the resident identity card information transmitted by the terminal to the background server is non-repudiated and will not be tampered with, the user information transmitted by the terminal may further include signature data of the ciphertext of the resident identity card information. That is, in the alternative implementation, the electronic cipher device signs the ciphertext of the resident identity card information. That is, the electronic cipher device performs a signing and calculation on the ciphertext of the resident identity card information by using the private key stored in the electronic cipher device, and transmits the signature data obtaining by performing the signing and calculation and the ciphertext of the resident identity card information to the terminal. The terminal may carry the ciphertext of the resident identity card information of the user and the signature data of the ciphertext of the resident identity card information as the user information in the authentication request to transmit the authentication request to the background server. The background server validates the signature data of the ciphertext of the resident identity card information. In specific applications, in order to save processes, the background server may firstly validate the signature data of the ciphertext of the resident identity card information and then authenticate e the identity of the user based on the ciphertext of the resident identity card information after the validation of the signature data passes. If the validation of the signature data fails, the identity of the user is no longer authenticated based on the ciphertext of the resident identity card information and the authentication request of the user is rejected directly.

In specific applications, in the above embodiment, during the signature calculation, the electronic cipher device calculates digest information of the ciphertext of the resident identity card information. The electronic cipher device encrypts the digest information by using the private key stored in the electronic cipher device and use the digest information encrypted by the private key as the signature data of the ciphertext of the resident identity card information. The electronic cipher device transmits the ciphertext of the resident identity card information together with the signature data of the ciphertext of the resident identity card information to the terminal. The terminal carries the ciphertext of the resident identity card information and the signature data of the ciphertext of the resident identity card information as the user information in the authentication request and transmits the authentication request to the background server. After receiving the authentication request, the background server firstly needs to validate the signature data of the ciphertext of the resident identity card information. The validating process is as follows. The background server decrypts the encrypted digest information received by using the public key of the electronic cipher device to obtain the digest information of the ciphertext of the resident identity card information; then the background server calculates the received digest information of the ciphertext of the resident identity card information and compares the digest information obtained by calculation with the digest information obtained by decryption. If the digest information obtained by calculation and the digest information obtained by decryption are the same, it indicates that the ciphertext of the resident identity card information has not been modified and the resident identity card information is complete.

With the above alternative implementation, it may prevent that illegal people uses the lost resident identity card and the electronic cipher device of the illegal people to authorize his identity when the resident identity card is lost by the user. Moreover, the private key of the electronic cipher device is used to sign the ciphertext of the resident identity card information to obtain the signature data of the ciphertext of the resident identity card information. The background server validates the signature data of the ciphertext of the resident identity card information. On the one hand, it is determined that the ciphertext of the resident identity card information is transmitted by the signer based on the signature data. On the other hand, it is compared whether the digest information obtained by the background server through calculating the ciphertext of the resident identity card information is consistent with the digest information obtained by decryption, thereby preventing illegal people from modifying the resident identity card information.

At step 202, the electronic cipher device obtains the information to be validated.

In an alternative implementation of the embodiment of the present disclosure, the information to be validated is obtained by the electronic cipher device through four ways without limitations.

Way One: the information to be validated is generated by the background server and is transmitted to the electronic cipher device through the terminal.

In the implementation, the background server generates the information to be validated after receiving the authentication request transmitted by the terminal, and carries the information to be validated in an authentication request response to transmit the authentication request to the terminal. Alternatively, the background server may encrypt the information to be validated and then transmit the encrypted information to be validated to the terminal so as to ensure the transmission security. For example, the background server may encrypt the information to be validated by using the private key of the background server, or by using the transmission key negotiated with the electronic cipher device.

The terminal receives the authentication request response which carries a plaintext or a ciphertext of the information to be validated from the background server, and transmits the plaintext or the ciphertext of the information to be validated to the electronic cipher device.

Alternatively, after receiving the authentication request transmitted by the terminal, the background server authenticates the identity of the user based on the user information carried in the authentication request. After the authentication succeeds, the background server generates the information to be validated. For example, the background server may generate the information to be validated based on the user information of the user, a serial number of the electronic cipher device, the current time, or other information, or the random number randomly generated by the background server may be as the information to be validated. This embodiment does not limit the manner in which the background server generates the information to be validated. To avoid the replay attack, alternatively, the information to be validated is one-time authentication data. That is, the information to be validated may be invalidated after being used once. The information to be validated may be a series of numbers, letters or symbols, or any combination of numbers, letters or symbols. This embodiment also does not limit the specific presentation form of the information to be validated. Certainly, the background server may also encrypt the plaintext of the information to be validated to generate the ciphertext of the information to be validated, so as to ensure the transmission security of the information to be validated. In addition, the encryption operation may be symmetric encryption or asymmetric encryption.

The electronic cipher device receives the information to be validated transmitted by the terminal. The electronic cipher device is further configured to decrypt the ciphertext of the information to be validated when the received information to be validated is a ciphertext.

Way Two: the information to be validated is generated by the electronic cipher device.

In the implementation, the electronic cipher device generates the information to be validated based on parameters synchronized with the background server. For example, the electronic cipher device generates the information to be validated according to an existing OTP manner. The parameters synchronized among the electronic cipher device and the background server may be temporal parameters, usage frequency parameters or other synchronization parameters. The information to be validated obtained by calculation through the electronic cipher device using the parameters synchronized with the background server does not need to be transmitted from the background server to the terminal, so as to ensure the security of the information to be validated and prevent the information to be validated from being intercepted during the transmission.

Way Three: the information to be validated is the user information obtained by the terminal.

In the implementation, the electronic cipher device receives the user information transmitted by the terminal and uses the user information as the information to be validated. The information to be validated is the user information (for example, the user's name, the user's resident identity card number, etc.) obtained by the terminal. The terminal transmits the user information to the electronic cipher device. The electronic cipher device receives the user information transmitted by the terminal and directly uses the user information as the information to be validated. Using, by the electronic cipher device, the user information obtained by the terminal as the information to be validated has the advantage of being simple and quick.

Way Four: the information to be validated is input to the electronic cipher device by the user. In the implementation, the background server may generate the information to be validated based on the above Way One and transmit the information to be validated to the terminal or other external devices. But the terminal or other external devices does not transmit the information to be validated to the electronic cipher device, instead, the terminal 20 or other external devices displays the information to be validated. Then the user inputs the information to be validated through an input device (such as a keyboard) of the electronic cipher device. Therefore, the device for obtaining the information to be validated is separated from the electronic cipher device. When the electronic cipher device of the user is lost, the illegal people cannot obtain the information to be validated, thereby preventing the illegal people from opening the account by using the electronic cipher device when the electronic cipher device is lost. Or, the user may input the user information into the electronic cipher device instead of transmitting the user information by the terminal, so as to prevent the hacker from remotely operating the user's terminal and modifying the user information transmitted from the terminal to the electronic cipher device.

At step 203, the electronic cipher device generates and displays the graphic identification code based on the information to be validated.

After obtaining the information to be validated, the electronic cipher device generates and displays the graphic identification code based on the information to be validated. The background server can conveniently identify the information to be validated subsequently.

In an alternatively implementation of the embodiment of the present disclosure, the manner in which the electronic cipher device generates the graphic identification code includes but is not limited to the following Manner One and Manner Two.

Manner One: the electronic cipher device directly converts the information to be validated into the graphic identification code.

That is, after obtaining the information to be validated, the electronic cipher device directly converts the information to be validated into the graphic identification code by using a graphic identification code algorithm. It should be noted that the graphic identification code algorithm is an algorithm for generating the graphic identification code from the information to be validated. For example, if the graphic identification code is a quick response code, the graphic identification code algorithm is an algorithm for generating the quick response code from the information to be validated, that is, a quick response code generating algorithm. By converting the information to be validated into the graphic identification code, the background server may conveniently identify the information to be validated subsequently.

Manner Two: the electronic cipher device calculates the information to be validated according to a preset algorithm and generates the graphic identification code corresponding to the calculation result.

Different from the above Manner One, after obtaining the information to be validated, the electronic cipher device does not directly convert the information to be validated into the graphic identification code by using the graphic identification code algorithm, but calculates the information to be validated according to the preset algorithm and then generates the graphic identification code corresponding to the calculation result with the graphic identification code algorithm. In this way, the amount of computation for generating the graphical identification code can be reduced and the processes can be saved.

Alternatively, the electronic cipher device calculating the information to be validated may include but be not limited to:

(1) The electronic cipher device uses the private key stored therein to sign the information to be validated.

In detail, the electronic cipher device may firstly calculate the digest information of the information to be validated and encrypt the digest information by using the private key stored therein to generate the signature data of the information to be validated. After obtaining the signature data of the information to be validated, the background server validates the signature data of the information to be validated with the public key corresponding to the private key of the electronic cipher device. It can prevent the hacker from tampering with the information to be validated on the one hand, and ensure that the information to be validated is transmitted by the specific electronic cipher device on the other hand.

(2) The electronic cipher device performs a MAC calculation on the information to be validated.

It should be noted that, the MAC algorithm is an encryption algorithm. The electronic cipher device encrypts the information to be validated without limitations to the MAC algorithm. Any algorithm for encryption is within the protection scope of the present disclosure. The encryption algorithm that can be used in the embodiment may be as follows.

1) Symmetric encryption algorithms including DES, 3DES or AES.

2) MAC algorithms; Symmetric MAC algorithms including DES-CBC, 3DES-CBC, AES-CBC; and HMAC algorithms including HMAC-MD5, HMAC-SHA1.

By encrypting the information to be validated, it is possible to prevent the illegal people from intercepting the information to be validated and then using the intercepted information to be validated for opening an account.

At step 204, the terminal obtains the picture including the facial image of the user and the graphic identification code displayed on the electronic cipher device and transmits the picture to the background server.

In an alternative implementation of the embodiment of the present disclosure, the picture including the facial image of the user and the graphic identification code displayed on the electronic cipher device may be obtained by capturing an image including the face of the user and the graphic identification code displayed on the electronic cipher device through the capturing device provided on the terminal, or by capturing the image including the face of the user and the graphic identification code displayed on the electronic cipher device through an external capturing device and then by transmitting the image to the terminal. In latter case, the hardware requirement for the terminal can be reduced, and it is unnecessary to provide the capturing device on the terminal.

At step 205, the background server receives the picture and validates the graphic identification code and the facial image of the user recorded in the picture.

After obtaining the picture including the facial image of the user and the graphic identification code displayed on the electronic cipher device, the terminal transmits the picture to the background server. After receiving the picture including the facial image of the user and the graphic identification code, the background server firstly identify the graphic identification code recorded in the picture to determine the identity of the user of the electronic cipher device. That is, the background server may validate whether information carried by the graphic identification code is predetermined information. For example, if the information to be validated is generated by the background server and transmitted to the electronic cipher device through the terminal, (1) when the electronic cipher device generates the graphic identification code directly from the information to be validated, the background server identifies the graphic identification code and determines whether the information carried in the graphic identification code is the same as the information to be validated generated by the background server; (2) when the electronic cipher device signs the information to be validated to generate the graphic identification code based on the signature data, the background server identifies the graphic identification code, obtains the information carried by the graphic identification code, and decrypts the information by using the public key of the electronic cipher device. On the other hand, the background server performs a Hash calculation on the information to be validated generated by the background server, compares the calculated result with the result of decrypting the above information to determine whether the two results are the same; (3) when the electronic cipher device performs the MAC calculation on the information to be validated and generates the graphic identification code from the calculation result, the background server identifies the graphic identification code, obtains the information carried by the graphic identification code. On the other hand, the background server performs the MAC calculation on the information to be validated generated by the background server, compares the calculated result with the information carried by the graphic identification code to determine whether the two results are the same. If the information to be validated is generated by the electronic cipher device, the validation of the graphic identification code by the background server is similar to that the information to be validated is generated by the background server, except that the information to be validated used for authentication is generated by background server by adopting the same manner as that adopted by the electronic cipher device, and details are not described herein again. If the information to be validated is the user information obtained by the terminal, the validation of the graphic identification code by the background server is similar to that the information to be validated is generated by the background server, except that the information to be validated used for authentication by the background server is obtained by the background server from the authentication request, and details are not described herein again. If the information to be validated is input to the electronic cipher device by the user, and if the information to be validated input by the user is generated by the background server and transmitted to the terminal or other external devices, the manner for validating the graphic identification code by the background server is same as the manner that the above information to be validated is generated by the background server and transmitted to the electronic cipher device through the terminal. If the information to be validated input by the user is the user information, the manner in which the background server validates the graphic identification code is the same with that the information to be validated is the user information obtained by the terminal, and details are not described herein again.

In addition, the background server may alternatively pre-store the identity information including the facial image of the user. When authenticating the facial image of the user included in the picture, the background server may compare the facial image of the user uploaded by the terminal with the pre-stored facial image of the user. If the two facial images match with each other, the validation passes, and if the two facial images do not match with each other the validation fails. In specific applications, the background server may store a correspondence between the identification information of the user and the identity information of the user. The identification information of the user may be a resident identity card number, or a resident identity card number plus a user name, or a serial number of the electronic cipher device used by the user, or a certificate used by the electronic cipher device used by the user. In an alternative implementation of the embodiment of the present disclosure, the background server may store the correspondence between the electronic cipher device (which may be identifiable by the serial number of the electronic cipher device, the certificate used, etc.) and the identity information of the user. In detail, when the user goes to handle the electronic cipher device, the electronic cipher device of the user and the identity information of the user may be uploaded to the background server through the counter to be stored in conjunction. Or, the background server may call an identity information system to display the facial image of the user based on the information of the electronic cipher device. After receiving the facial image of the user uploaded by the terminal, the background server may validate the facial image of the user by the followings. The pre-stored identity information of the user corresponding to the electronic cipher device is obtained. The identity information includes the facial image of the user. The facial image of the user recorded in the picture is compared with the facial image of the user included in the obtained identity information. It is determined that the validation passes if the two facial images match with each other and that the validation fails if the two facial images do not match with each other. In specific applications, the comparison method can be face recognition technology, and also can be identified by background staff. In the case of matching, the background server can confirm whether or not the electronic cipher device is of the person requesting opening an account. It may prevent the illegal person from fraudulently opening the account if the resident identity card and the electronic cipher device are lost.

In addition, in an alternative implementation of the embodiment of the present disclosure, the background server transmits a retransmission instruction to the terminal for instructing the terminal to re-upload the picture until the validation passes or the validation reaches a preset number of times when the validation of the graphic identification code and the validation of the facial image of the user recorded in the picture both fail. By allowing the user to upload pictures for multiple times, it can prevent misidentification problems that occur during image recognition. Limiting the number of uploading pictures can prevent the user from unrestricted uploading pictures with the failing validation.

With the above remote authentication method, the electronic cipher device generates the graphic identification code from the information to be validated. The terminal obtains the picture including the facial image of the user and the graphic identification code and transmits the picture to the background server. The background server may determine the identity of the user by identifying the facial image of the user and graphic identification code included in the picture. The background server compares the facial image of the user uploaded by the terminal and the pro-stored facial image of the user, and determines that whether the electronic cipher device is of a real person for opening the account when the comparison passes, thereby preventing the illegal people from fraudulently opening the account if the resident identity card and the electronic cipher device are lost.

Embodiment Five

Figure 3:
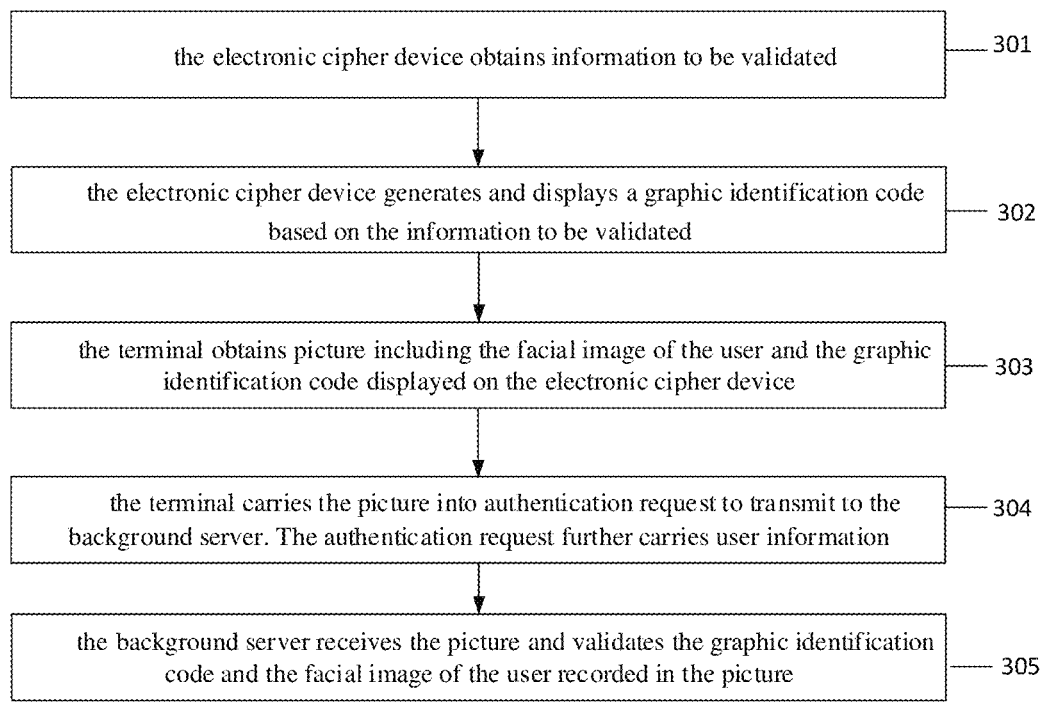
FIG. 3 is a flow chart of another remote authentication method provided by Embodiment Five of the present disclosure.

This embodiment provides another remote authentication method, which is an authentication method implemented via the system provided in Embodiment Two. FIG. 3 is a flow chart of another remote authentication method provided by Embodiment Four of the present disclosure. The method embodiment illustrated as FIG. 3 includes the following steps.

At step 301, the electronic cipher device obtains information to be validated.

At step 302, the electronic cipher device generates and displays a graphic identification code based on the information to be validated.

At step 303, the terminal obtains a picture including the facial image of the user and the graphic identification code displayed on the electronic cipher device.

At step 304, the terminal carries the picture into an authentication request to transmit the authentication request to the background server. The authentication request further carries user information therein.

At step 305, the background server receives the picture and validates the graphic identification code and the facial image of the user recorded in the picture.

Different from Embodiment Four, in the embodiment, before the electronic cipher device transmits the authentication request to the background server, the electronic cipher device generates and displays the graphic identification code. The terminal obtains the picture including the facial image of the user and the graphic identification code. The terminal transmits the above picture to the background server while transmitting the authentication request. The background server validates the graphic identification code and the facial image of the user recorded in the picture thereby remotely authenticating the identity of the user.

In the method:

At step 301, the electronic cipher device obtains the information to be validated.

In an alternative implementation of the embodiment of the present disclosure, the information to be validated is obtained by the electronic cipher device through three ways without limitations.

Way One: the information to be validated is generated by the electronic cipher device.

In the implementation, the electronic cipher device generates the information to be validated based on parameters synchronized with the background server. For example, the electronic cipher device generates the information to be validated according to an existing OTP manner. The parameters synchronized among the electronic cipher device and the background server may be temporal parameters, usage frequency parameters or other synchronization parameters. The information to be validated obtained by calculation through the electronic cipher device using the parameters synchronized with the background server does not need to be transmitted from the background server to the terminal, so as to ensure the security of the information to be validated and prevent the information to be validated from being intercepted during the transmission.

Way Two: the information to be validated is the user information obtained by the terminal.

In the implementation, the electronic cipher device receives the user information transmitted by the terminal and uses the user information as the information to be validated. The information to be validated is the user information (for example, the user's name, the user's resident identity card number, etc.) obtained by the terminal. The terminal transmits the user information to the electronic cipher device. The electronic cipher device receives the user information transmitted by the terminal and directly uses the user information as the information to be validated. Using by the electronic cipher device the user information obtained by the terminal as the information to be validated has the advantage of being simple and quick.

Way Three: the information to be validated is input to the electronic cipher device by the user.

In the implementation, the user may input the user information into the electronic cipher device instead of transmitting the user information by the terminal, so as to prevent the hacker from remotely operating the user's terminal and modifying the user information transmitted from the terminal to the electronic cipher device.

At step 302, the electronic cipher device generates and displays the graphic identification code based on the information to be validated.

After obtaining the information to be validated, the electronic cipher device generates and displays the graphic identification code based on the information to be validated. Therefore, the background server may conveniently identify the information to be validated subsequently. In the embodiment, the manner in which the electronic cipher device generates the graphic identification code based on the information to be validated is the same as that in Embodiment Four of the present disclosure. That is, the electronic cipher device directly converts the information to be validated into the graphic identification code or the electronic cipher device calculates the information to be validated according to a preset algorithm and generates the graphic identification code corresponding to a calculation result. The specific implementation manner is the same as that in Embodiment Four, and details are not described herein again. In addition, the calculation performed by the electronic cipher device on the information to be validated is also the same as that in Embodiment Four, and details are not described herein again.

At step 303, the terminal obtains the picture including the facial image of the user and the graphic identification code displayed on the electronic cipher device.

The manner in which the terminal obtains the picture including the facial image of the user and the graphic identification code displayed on the electronic cipher device is the same as that in Embodiment Four of the present disclosure, and details are not described herein again.

After obtaining the above picture, the terminal carries the picture in the authentication request and transmits authentication request to the background server. The user information carried in the authentication request is the same as that in Embodiment Four of the present disclosure, which may be may be the ciphertext of the resident identity card information of the user or may be the signature data of the ciphertext of the resident identity card information, and details are not described herein again. The manner in which the resident identity card reading module reads the resident identity card information is also the same as that in Embodiment Four of the present disclosure, and details are not described herein again.

At step 304, the terminal carries the picture into the authentication request and transmits the authentication request to the background server. The authentication request further carries the user information therein.

After obtaining the above picture, the terminal transmits the authentication request together with the picture to the backend server. The user information in the authentication request may be resident identity card information of the user, the ciphertext of the resident identity card information of the user, or the signature data of the ciphertext of the resident identity card information of the user, which is the same as that in the foregoing Embodiment Four, and details are not described herein again. After the background server receives the authentication request, the way of validating the resident identity card information of the user is the same as that in Embodiment Four, and details are not described herein again.

At step 305, the background server receives the picture and validates the graphic identification code and the facial image of the user recorded in the picture.

The background server receives the picture and verifies the graphic identification code and the user's facial image recorded in the picture.

After the background server receives the authentication request, the background server validates the identity of the user according to the ciphertext of the resident identity card information in the same manner as in Embodiment Four of the present disclosure, and details are not described herein again.

After the background server receives the above picture that is carried in the authentication request transmitted by the terminal, the background server validates the graphic identification code and the facial image of the user recorded in the picture in the same way as in Embodiment Four of the present disclosure, and details are not described herein again.

In addition, when the validation of the graphic identification code and the validation of the facial image of the user through the background server both fail, the background server transmits a retransmission instruction for instructing the terminal to re-upload the picture until the validation succeeds or the validation reaches a preset number of times.

By allowing the user to upload pictures for multiple times, it can prevent misidentification problems that occur during image recognition. Limiting the number of uploading pictures can prevent the user from unrestricted uploading pictures with the failing validation.

Embodiment Six

The embodiment provides a remote account opening method, which uses the authentication method provided in Embodiment Four or Embodiment Five to authenticate the identity of the user. After the authentication passes, a remote account opening is performed, which enables the user to open an account remotely anytime and anywhere, which is convenient for the user and may improve user's experience.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order based on the related functions. This should be understood by those skilled in the art which embodiments of the present disclosure belong to.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are exemplary and cannot be construed to limit the present disclosure, and changes, modifications, alternatives, and variants can be made by those skilled in the art to the embodiments without departing from spirit, principles and within the scope of the present disclosure.

What is claimed is:

1. A remote authentication method, comprising:
   obtaining, by an electronic cipher device, information to be validated, wherein the information to be validated comprises one-time authentication information;
   generating and displaying, by the electronic cipher device, a graphic identification code based on the information to be validated;
   obtaining, by a terminal, a picture comprising a facial image of a user and the graphic identification code displayed on the electronic cipher device;
   transmitting, by the terminal, the picture to a background server, comprising: carrying, by the terminal, the picture in an authentication request to transmit the authentication request to the background server, wherein the authentication request further carries user information; and receiving, by the background server, the picture, and validating, by the background server, the graphic identification code and the facial image of the user recorded in the picture;

before transmitting, by the terminal, the authentication request to the background server, the method further comprising: reading, by a resident identity card reading module, resident identity card information stored in a resident identity card of the user; encrypting, by the electronic cipher device, the resident identity card information read through the resident identity card reading module; and transmitting, by the electronic cipher device, a ciphertext of the resident identity card information obtained after encrypting the resident identity card information to the terminal;

the user information comprising: the ciphertext of the resident identity card information; and after transmitting, by the terminal, the authentication request to the background server, the method further comprising: receiving, by the background server, the authentication request and validating, by the background server, an identity of the user based on the ciphertext of the resident identity card information.

2. The method according to claim 1, before transmitting by the terminal the authentication request to the background server, the method further comprising: obtaining, by the terminal, signature data of the ciphertext of the resident identity card information from the electronic cipher device;

the user information further comprising: the signature data of the ciphertext of the resident identity card information; and before validating by the background server the identity of the user based on the ciphertext of the resident identity card information, the method further comprising: validating, by the background server, the signature data of the ciphertext of the resident identity card information.

3. The method according to claim 1, wherein validating by the background server the identity of the user based on the ciphertext of the resident identity card information comprises:

decrypting, by the background server, the ciphertext of the resident identity card information to obtain the resident identity card information;

obtaining, by the background server, pre-stored resident identity card information corresponding to the electronic cipher device; and comparing, by the background server, the obtained resident identity card information with the decrypted resident identity card information, confirming, by the background server, that identity validation of the user who currently requests opening an account passes when the obtained resident identity card information matches with the decrypted resident identity card information, or confirming, by the background server, that identity validation of the user who currently requests opening an account fails when the obtained resident identity card information does not match with the decrypted resident identity card information.

4. The method according to claim 1, wherein obtaining, by the electronic cipher device, the information to be validated comprises:

generating, by the electronic cipher device, the information to be validated based on parameters synchronized with the background server.

5. The method according to claim 1, wherein generating, by the electronic cipher device, the graphic identification code based on the information to be validated comprises:

converting, by the electronic cipher device, the information to be validated into the graphic identification code; or calculating, by the electronic cipher device, the information to be validated according to a preset algorithm and generating, by the electronic cipher device, the graphic identification code corresponding to a calculation result.

6. The method according to claim 5, wherein calculating, by the electronic cipher device, the information to be validated according to the preset algorithm comprises:

signing, by the electronic cipher device, the information to be validated using a private key stored in the electronic cipher device; or performing, by the electronic cipher device, a message authentication code (MAC) calculation on the information to be validated.

7. The method according to claim 1, wherein obtaining by the terminal the picture comprising the facial image of the user and the graphic identification code displayed on the electronic cipher device, comprises:

capturing, by a capturing device provided on the terminal, an image comprising the facial image of the user and the graphic identification code displayed on the electronic cipher device, to acquire the picture; or receiving, by the terminal, the picture comprising the facial image of the user and the graphic identification code displayed on the electronic cipher device from an external device.

8. The method according to claim 1, wherein validating by the background server the facial image of the user recorded in the picture comprises:

obtaining, by the background server, pre-stored identity information of the user corresponding to the electronic cipher device, wherein the identity information comprises a facial image of a user; and comparing, by the background server, the facial image of the user recorded in the picture with the facial image of the user comprised in the obtained identity information, confirming, by the background server, that validation passes when the facial image of the user recorded in the picture matches with the facial image of the user comprised in the obtained identity information, or confirming, by the background server, that validation fails when the facial image of the user recorded in the picture does not match with the facial image of the user comprised in the obtained identity information.

9. The method according to claim 1, after the background server fails to validate the graphic identification code and the facial image of the user recorded in the picture, further comprising:

transmitting, by the background server, a retransmission instruction to the terminal for instructing the terminal to re-upload the picture until the validation passes or the validation reaches a preset number of times.

10. The method according to claim 1, further comprising opening an account remotely after the validation passes.

11. A remote authentication system, comprising an electronic cipher device, a terminal and a background server, wherein the electronic cipher device is configured to obtain information to be validated and to generate and display a graphic identification code based on the information to be validated, wherein the information to be validated comprises one-time authentication information;

the terminal is configured to obtain a picture comprising a facial image of a user and the graphic identification code displayed on the electronic cipher device and to transmit the picture to the background server; and the background server is configured to receive the picture and to validate the graphic identification code and the facial image of the user recorded in the picture;

wherein the terminal is configured to transmit the picture to the background server by: carrying the picture in an authentication request to transmit the authentication request to the background server, wherein the authentication request further carries user information; and wherein the system further comprises a resident identity card reading module;

wherein the resident identity card reading module is configured to read resident identity card information stored in a resident identity card of the user and to transmit the resident identity card information to the electronic cipher device;

wherein the electronic cipher device is further configured to encrypt the resident identity card information read through the resident identity card reading module and to transmit a ciphertext of the resident identity card information obtained after encrypting the resident identity card information to the terminal;

wherein the user information comprises: the ciphertext of the resident identity card information of the user; and wherein the background server is further configured to receive the authentication request and to validate an identity of the user according to the ciphertext of the resident identity card information.

12. The system according to claim 11, wherein the electronic cipher device is configured to generate the graphic identification code by:

converting the information to be validated into the graphic identification code; or calculating the information to be validated according to a preset algorithm and generating the graphic identification code corresponding to a calculation result; and the electronic cipher device is configured to calculate the information to be validated by:

signing the information to be validated using a private key stored in the electronic cipher device; or performing a message authentication code MAC calculation on the information to be validated.

13. The system according to claim 11, wherein the background server is further configured to open an account remotely after the validation passes.

14. The system according to claim 11, wherein, the terminal is further configured to obtain signature data of the ciphertext of the resident identity card information from the electronic cipher device;

the user information further comprises: the signature data of the ciphertext of the resident identity card information; and the background server is further configured to validate the signature data of the ciphertext of the resident identity card information.

15. The system according to claim 11, wherein the background server is configured to validate the identity of the user by:

decrypting the ciphertext of the resident identity card information to obtain the resident identity card information;

obtaining pre-stored resident identity card information corresponding to the electronic cipher device; and comparing the obtained resident identity card information with the decrypted resident identity card information, confirming that identity validation of the user who currently requests opening an account passes when the obtained resident identity card information matches with the decrypted resident identity card information, or confirming that identity validation of the user who currently requests opening an account fails when the obtained resident identity card information does not match with the decrypted resident identity card information.

16. A remote authentication method, comprising:

transmitting, by a terminal, an authentication request to a background server, wherein the authentication request carries user information;

obtaining, by an electronic cipher device, information to be validated, wherein the information to be validated comprises one-time authentication information;

generating and displaying, by the electronic cipher device, a graphic identification code based on the information to be validated;

obtaining, by the terminal, a picture comprising a facial image of a user and the graphic identification code displayed on the electronic cipher device;

transmitting, by the terminal, the picture to the background server;

before transmitting by the terminal the authentication request to the background server, the method further comprising: reading, by a resident identity card reading module, resident identity card information stored in a resident identity card of the user; encrypting, by the electronic cipher device, the resident identity card information read through the resident identity card reading module; and transmitting, by the electronic cipher device, a ciphertext of the resident identity card information obtained after encrypting the resident identity card information to the terminal;

the user information comprising: the ciphertext of the resident identity card information; and after transmitting by the terminal the authentication request to the background server, the method further comprising: receiving, by the background server, the authentication request and validating, by the background server, an identity of the user based on the ciphertext of the resident identity card information.

17. The method according to claim 16, before transmitting by the terminal the authentication request to the background server, the method further comprising: obtaining, by the terminal, signature data of the ciphertext of the resident identity card information from the electronic cipher device;

the user information further comprising: the signature data of the ciphertext of the resident identity card information; and before validating by the background server the identity of the user based on the ciphertext of the resident identity card information, the method further comprising: validating, by the background server, the signature data of the ciphertext of the resident identity card information.

18. The method according to claim 16, wherein validating by the background server the identity of the user based on the ciphertext of the resident identity card information comprises:
- decrypting, by the background server, the ciphertext of the resident identity card information to obtain the resident identity card information;
- obtaining, by the background server, pre-stored resident identity card information corresponding to the electronic cipher device; and
- comparing, by the background server, the obtained resident identity card information with the decrypted resident identity card information, confirming, by the background server, that identity validation of the user who currently requests opening an account passes when the obtained resident identity card information matches with the decrypted resident identity card information, or confirming, by the background server, that identity validation of the user who currently requests opening an account fails when the obtained resident identity card information does not match with the decrypted resident identity card information.

* * * * *